United States Patent [19]
Kimura et al.

[11] Patent Number: 4,766,156
[45] Date of Patent: Aug. 23, 1988

[54] PELLETS OF CHLORINATED VINYL CHLORIDE RESIN COMPOSITION, PRE-EXPANDED PARTICLES AND PROCESS FOR PREPARING THEREOF

[75] Inventors: Yoshihiro Kimura, Osaka; Hisao Shimazu, Settsu, both of Japan

[73] Assignee: Kanegafuchi Kagaku Kogyo Kabushiki Kaisha, Osaka, Japan

[21] Appl. No.: 82,630

[22] Filed: Aug. 5, 1987

[30] Foreign Application Priority Data

Aug. 7, 1986 [JP] Japan ................................ 61-186284
Aug. 12, 1986 [JP] Japan ................................ 61-188812
Feb. 9, 1987 [JP] Japan ................................ 62-28676

[51] Int. Cl.⁴ ............................................. C08J 9/22
[52] U.S. Cl. .......................................... 521/58; 264/53; 264/143; 521/56; 521/60; 521/79; 521/145
[58] Field of Search .................... 521/56, 60, 58, 145, 521/79; 264/53, 143

[56] References Cited

U.S. PATENT DOCUMENTS 4,360,602 11/1982 Nehmey et al. ................. 521/81
4,370,286 1/1983 Nehmey et al. ................. 521/81
4,413,065 11/1983 Hall et al. ....................... 521/145
4,613,626 9/1986 Sakata et al. ................... 521/60
4,675,345 6/1987 Pecsok ............................ 521/60
4,687,641 8/1987 Maeda et al. ................... 521/60

Primary Examiner—Morton Foelak
Attorney, Agent, or Firm—Armstrong, Nikaido, Marmelstein & Kubovcik

[57] ABSTRACT

Pellets of a chlorinated vinyl chloride resin composition comprising inorganic materials, a solvent and a blowing agent; a pre-expanded particle of a chlorinated vinyl chloride resin comprising inorganic materials and a solvent and a process for preparing the pre-expanded particle of the chlorinated vinyl chloride resin containing inorganic materials which comprises kneading a chlorinated vinyl chloride resin, inorganic materials and a solvent, pelletizing the kneaded mixture, impregnating a physical blowing agent into the resulting pellets and pre-expanding the pellets. The present invention makes it possible to be contained a large amount of inorganic materials in a chlorinated vinyl chloride resin by forming a uniform gel phase of the chlorinated vinyl chloride resin and the solvent and wrapping inorganic materials in the gel phase. A foamed article produced by employing pre-expanded particles of the chlorinated vinyl chloride resin containing inorganic materials has an excellent heat resistance, i.e. the foamed article generates little heat, produces little smoke and little poison gas and is hardly strained and cracked at burning, and further, has a large dimensional stability.

5 Claims, No Drawings

PELLETS OF CHLORINATED VINYL CHLORIDE RESIN COMPOSITION, PRE-EXPANDED PARTICLES AND PROCESS FOR PREPARING THEREOF

BACKGROUND OF THE INVENTION

The present invention relates to pellets of a chlorinated vinyl chloride resin (hereinafter referred to as "CPVC") compositon, pre-expanded particles and a process for preparing thereof, and more particularly to pellets of CPVC composition, pre-expanded particles prepared from the pellets and a process for preparing thereof for obtaining a foamed article having characteristics such that the foamed article generates little heat, produces little smoke and little poison gas and is hardly strained and cracked at burning, and further, has a large dimensional retention when an obtained foamed article is used in an atmosphere of high temperatures, i.e. the foamed article is excellent in heat resistance.

Since a CPVC has a large chlorine content, generates little heat and produces little smoke at burning, it is expected that the CPVC is employed as a heat insulating material having a high fireproofing property. However, a foamed article of the CPVC has a problem in fireproofing property, that is, the foamed article is largely shrunk when it is exposed in an atmosphere of high temperatures, for instance, in fire and the like. In order to prevent the foamed article from shrinkage, it has been studied to contain a large amount of inorganic materials in the foamed article.

However, it has not yet been succeeded to get an excellent foamed CPVC article containing a large amount of inorganic materials by using the pre-expanded particles of the CPVC and the process for preparing thereof.

On the other hand, the melt-adhesion of the particles is lowered when the pre-expanded particles containing a large amount of the inorganic materials are subjected to an expansion molding in a mold because the inorganic materials existing on the surface of the particles act as an anti-blocking agent.

Besides, since the CPVC has a high softening temperature and requires high temperatures to give the excellent melt-adhesion of pre-expanded articles of the CPVC, a conventional molding machine used for the expansion molding of polystyrene or polyethylene can not be employed. Accordingly, there is a problem that a molding machine which is proof against high temperatures and high pressures which are usually generated from steam employed as a heat sourse should be specially equipped.

Still more, even though a large amount of the inorganic materials can be contained in the foamed article, there are some problems such that the residual stress and/or residual strain in the foamed article which are caused by the drawing of the resin during expansion are large. In such case, the shrinkage is generated due to the residual stress and/or the residual stain when the article is exposed in an atmosphere of high temperatures. That is, the shrinkage of the foamed article can not be minimized by containing the inorganic materials.

As the result of repeating earnest studies in order to solve the above-mentioned problems in the conventional process, there have been found the pellets of CPVC composition, the pre-expanded particles and the process for preparing thereof which are capable of solving the problems, and the present invention has been accomplished.

SUMMARY OF THE INVENTION

According to the present invention, there are provided pellets of a CPVC composition comprising inorganic materials, a solvent and a blowing agent and pre-expanded particles of the CPVC comprising inorganic materials and a solvent. And further, according to the present invention, there is provided a process for preparing pre-expanded particles of the CPVC containing inorganic materials, which comprises kneading a CPVC, inorganic materials and a solvent, pelletizing the kneaded mixture, impregnating a blowing agent into the resulting pellets and pre-expanding the pellets.

According to the present invention, the above-mentioned problems are solved by employing pre-expanded particles of the CPVC containing a solvent prepared by expanding pellets of a CPVC composition containing inorganic materials, a solvent and a blowing agent.

That is, by employing a solvent compatible with the CPVC and by containing the solvent into the pellets of CPVC composition, the viscosity of the CPVC composition is lowered when the pellets of the CPVC composition are expanded, and thereby the residual stress and/or residual strain in the pre-expanded particles are released and further, the deterioration of the effect of dimensional stability which is occurred by containing inorganic materials is prevented by lowering the shrinkage due to residual stress and/or strain.

Also, the present invention makes it possible to obtain a foamed article having a high fusion percentage by employing a conventional molding machine used for the expansion molding of a polystyrene or polyethylene resin at low molding temperatures. And because of containing the solvent compatible with the CPVC, the softening temperature of the resin is lowered and the fusion percentage of the pellets which constitute the finished product is improved.

Further, the present invention makes it possible to prepare pre-expanded particles of the CPVC containing a large amount of the inorganic materials by preparing and kneading the CPVC and inorganic materials and a satilizer as occasion demands under the condition of the existence of the solvent to form a gel, pelletizing the formed gel, impregnating a physical blowing agent into the obtained pellets after not removing the solvent or removing the excess solvent by volatilization in the occasion that the amount of solvent which should be contained in the pre-expanded particles is small and then pre-expanding the pellets by heating then with a heating source such as steam.

That is, the present invention makes it possible to add a large amount of inorganic materials in the CPVC by forming a uniform gel phase of the CPVC and the solvent and wrapping the inorganic materials in the gel phase.

Though the functions of the solvent are not always obvious, it is thought that the solvent has a function to increase the degree of wrapping inorganic materials in the resin parts by forming a uniform gel phase and increasing the volume of the resin parts in comparison to the case that the solvent is not included and by lowering the viscosity of the resin parts. Also, it is thought that the air and moisture bonded on the surface of the inorganic materials are removed by wetting the surface of the inorganic materials with a solvent, and thereby the surface of the inorganic materials and the resin parts are stiffly adhered.

From the above-mentioned effects, the inorganic materials are completely wrapped with a thin film of the resin, and thereby the trouble that the cells are broken in the discontinuous part of the resin phase in the process of the expansion can be avoided.

Still more, since the solvent is existed in the pellets, the processing temperature for molding comes to be largely lower than a usual processing temperature for molding a CPVC and decrease dangers such as the troubles of decomposition and deterioration which are often occurred when the CPVC is produced are generated.

These and other objects of the present invention will become apparent from the description hereinafter.

DETAILED DESCRIPTION OF THE INVENTION

The term "CPVC" in the present invention means not only an chlorinated polyvinyl chloride resin but also a mixed resin containing chlorinated polyvinyl chloride at a content of not less than 50% by weight. Examples of the resin which is mixed with chlorinated polyvinyl chloride are, for instance, vinyl chloride resin, chlorinated polyethylene, and the like.

As the vinyl chloride resin which is chlorinated, a copolymer containing vinyl chloride at a content of not less than 50% by weight can be used as well as a usual vinyl chloride resin.

Examples of the component which is copolymerized with vinyl chloride are, for instnace, vinyl acetate, vinylidene chloride, ethylene, and the like.

Any chlorinating methods which are conventionally adopted, for instance, photo-chlorination method under ultraviolet irradiation, and the like can be employed in the present invention.

When the average degree of polymerization of the CPVC is too small, the properties of the obtained foamed article is lowered, and when the average degree of polymerization is too large, it is difficult to industrially produce such a CPVC. Therefore, it is suitable that the CPVC has an average degree of polymerization of 300 to 5000 and a chlorine content of 60 to 75% by weight, preferably an average degree of polymerization of 1000 to 3000 and a chlorine content of 60 to 70% by weight.

The particle size of the CPVC is not limited in the present invention if it is in a range which is usually used.

The inorganic materials used in the present invention are, for instance, inorganic particles having an average particle size of about 0.01 to 300 μm, inorganic fibrous materials having an average fiber length of about 1 μm to 50 mm, and the like.

The kinds of the inorganic materials are not particularly limited in the present invention. However, from the viewpoint of cost and commercial availability, it preferable that the inorganic materials are, for instance, inorganic particles such as talc, calcium carbonate, aluminium hydroxide and magnesium hydroxide; inorganic fibrous materials such as asbestos, rock wool and glass fiber, and the like. Also, hollow materials such as shirasu balloon may be used. These inorganic materials may be used alone or in admixture thereof.

The amount of the inorganic materials is adjusted in accordance with the uses of the obtained foamed article which is a final product and is usually in a range of 5 to 1000 parts by weight, preferably 5 to 500 parts by weight based on 100 parts by weight of the CPVC.

As a solvent used in the present invention, any kinds of the solvent may be basically employed if the solvent has a compatibility with the CPVC. There are several methods to estimate the compatibility. Among the methods, the method that a mixture of 100 parts by weight of the CPVC having an average degree of polymerization of 2500 and a chlorine content of 67% by weight, 100 parts by weight of a solvent and 6 parts by weight of bis(di-n-butyltin monolaurate maleate) as a stabilizer is kneaded with a Brabender plastograph and then the temperature is measured when the mixture shows a maximum torque is employed. It is preferable that the solvent has a temperature of not more the 170° C. when the maximum torque is shown by measuring the above-mentioned method.

Examples of the solvent are, for instance, an aromatic hydrocarbon such as benzene, toluene, xylene or diethylbenzene (hereinafter referred to as "DEB"); a halogenated hydrocarbon such as 1,2,4-trichlorobenzene; a derivative of polyhydric alcohol such as butyl cellosolve (hereinafter referred to as "BC"); a ketone such as di-isobutyl ketone (hereinafter referred to as "DIBK") or cyclohexanone (hereinafter referred to as "CNON"); an ester such as isooctyl acetate (hereinafter referred to as "IOA"); a carbonic acid derivative such as diethyl carbonate; a phosphorus compound such as trischloroethyl phosphate; a nitrogen compound such as N,N-dimethylformamide; and the like. These solvents may be employed alone or in admixture thereof.

It is preferable that the solvent is contained in the pellets of the CPVC composition as much as possible so as to impregnate a large amount of the inorganic materials into the pre-expanded particles and the foamed article and so as to make the residual stress and residual strain remained in the pre-expanded particles small. However, when the amount of the solvent is too much, blocking is sometimes generated between the pelltes. Therefore, generally it is suitable that the amount of the solvent is 10 to 2000 parts by weight, preferably 50 to 500 parts by weight based on 100 parts by weight of the CPVC although the amount depends on the compatibility of the solvent and the CPVC.

Also, it is preferable that a large amount of solvent is contained in a pre-expanded particle to improve the fusibility of the pre-expanded particles and to lower the softening temperature of the resin at the time of foaming in a mold. However, when the amount of the solvent contained in the pre-expanded partilces is too much, a foamed article after expanding in a mold sometimes shows a shrinkage by vaporizing and escaping the solvent from the foamed article.

Therefore, it is suitable that the amount of the solvent is 1 to 200 parts by weight, preferably 5 to 100 parts by weight based on 100 parts by weight of the CPVC.

As the physical blowing agent used in the present invention, generally, any kinds of the blowing agent can be used if the blowing agent can be impregnated into the pellets of the CPVC compostion of the present invention. However, it is preferable that the physical blowing agent has a small afinity with a solvent in order to prevent that the efficiency obtained by impregnating the blowing agent into the pellets is lowered and that the blowing gases during the expansin are escaped. From the above-mentioned viewpoint, a physical blowing agent which is suitable for a solvent is preferably employed in the present invention. Examples of a physical blowing agent are, for instance, a fluorinated hydrocarbon such as trichlorofluoromethane, dichlorodifluoromethane or dichlorotetrafluoroethane; a hydrocarbon such as propane, butane or pentane, or the like, and they are suitably used in accordance with the kinds of the solvent.

The amount of the physical blowing agent impregnated into the pellet of the CPVC composition can be suitably prepared in accordance with a desired expansion ratio. Further, the conditions for impregnation such as a temperature at impregnating step and an impregnation period of time are adjusted in accordance with the amount of the physical blowing agent impregnated into the pellets of the CPVC composition.

As a stabilizer used in the present invention, any kinds of the stabilizer can be used if the stabilizer has a capacity to prevent the decomposition and deterioration of the CPVC.

In the present invention, a material which is usually used as an additive agent of a plastic material, for instance, a pigment such as titanium oxide or ultramarine blue; an antistatic agent such as a tertiary amine or an alkyl sulfonate, or the like can be used as occasional demands.

A representative example of the process for preparing the pellets of the CPVC composition and the pre-expanded particles is explained below.

First, the prescribed amount of materials in the form of powder are thoroughly mixed by employing a Henschel mixer, a super mixer, or the like. The mixed powder of the materials is put into an intensive kneader with liquid materials and then the mixture is kneaded to mix uniformly in an appropriate period of time.

The kneaded admixture is supplied to an extruder such as a screw extruder or a plunger extruder and then is extruded to give a strand. The strand is cut with a proper cutter such as a pelletizer to give pellets. Since a solvent is contained in the pellets, if necessary, the solvent may be reduced by volatilizing in accordance with the amount of the solvent to be remained in the pre-expanded partilces. Then the pellets are put into a sealed vessel with a physical blowing agent and the sealed vessel is kept at a prescribed temperature which is usually 10° to 70° C. and for a proper period of time which is usually 3 to 15 hours to impregnate the physical blowing agnet into the pellets.

The detailed conditions for the impregnation are properly determined in accordance with the grade of the CPVC, kinds and amount of the solvent, kinds of the physical blowing agent, a desired expansion ratio, and the like.

After completing the impregnation, the pellets are taken out from the sealed vessel and are pre-expanded by heating with, e.g., steam, hot water, hot air, or the like. The conditions for pre-expansion are properly determined in accordance with the grade of the CPVC, kinds and amount of the solvent, kinds and impregnated amount of the physical blowing agent, a desired expansion ratio, and the like.

After the amount of the solvent in the pre-expanded particles is adjusted to the desired amount by the method such as air-drying, if necessary, a physical blowing agent is impregnated again into the pre-expanded particles, and then the pre-expanded particles are foamed by a conventional process such as a process of foaming in a mold to give a foamed article. That is, the pre-expanded particles are filled in a mold and then heated with a heating source such as steam to fuse,
adhere and expand each other in order to get a finished foamed article.

The above-mentioned process is only one example of the process of the present invention. Therefore, any processes may be employed in the present invention if the processes satisfy the fundamental principles of the present invention, that is, a uniform gel phase is formed by the CPVC and the solvent and the inorganic materials are wrapped with the gel phase.

The present invention is more specifically described and explained by means of the following Examples. It is to be understood that the present invention is not limited to the Examples, and various changed and modifications may be made in the present invention without departing from the sprit and scope thereof.

EXAMPLES 1 TO 11

There was prepared 2,500 g of a foamable composition by using the materials shown in Table 1 in the mixing ratio shown in Table 2. A CPVC and inorganic materials were mixed for 30 minutes in a Henschel mixer having a content volume of 10 l.

The mixed powder of the materials was poured into a intensive kneader having a content volume of 3 l with a solvent and a stabilizer, and the mixture was kneaded at 100° to 130° C. for 30 minutes. After the mixture was supplied to a plunger extruder and maintained at 185° C. for 35 minutes, the mixture was cooled to the temperature of 70° to 80° C. and was extruded through dies having a bore diameter of 3 mm to give a strand. The strand was cut into a length of 2 to 4 mm with a cutter (a pelletizer) to produce pellets.

An autoclave having a content volume of 8 l was charged with about 1000 g of the obtained pellets and thereto a physical blowing agent was poured. The autoclave was maintained at room temperature for the period of time shown in Table 2 under the state that the pellets were dipped in the physical blowing agent (hereinafter referred to as "liquid phase impregnation"). The vapour pressure of the physical blowing agent was confirmed with a manometer equipped to the autoclave.

Then, the pellets were taken out from the autoclave and were put into a net basket having a lid made of stainless steel, and the pellets were pre-expanded by dipping the basket into hot water at the temperature and for the period of time shown in Table 2.

The obtained pre-expanded particles were put into a net basket made of polypropylene and were air-dried at room temperature to adjust the amount of the solvent contained in the pellets. An autoclave having a content volume of 80 l was charged with the obtained pre-expanded particles and the above-mentioned physical blowing agent and was sealed. The particles were impregnated with the blowing agent again at room temperature for the period of time shown in Table 3 and were put into a mold of aluminium alloy having an inner size of 250 mm×250 mm×25 mm and having holes for introducing steam. The expansion was carried out in the mold by using a usual molding machine at the foaming temperature shown in Table 3 to give a foamed article.

The amount of the solvent and the blowing agent contained in the pre-expanded particles and the expansion ratio of the particles, and apparent density, expansion ratio and the percentage of melt-adhesion of the foamed article were measured in accordance with the following methods. The results are shown in Table 3.

Amount of the solvent and the blowing agent contained in the pre-expanded particles After 0.5 to 1 g of the pre-expanded particles were weighed and were dissolved into 20 ml of tetrahydrofuran, the solution was subjected to gas chromatography analysis and amounts of the solvent and the blowing agent was measured.

Apparent density

A proper quantity of the pre-expanded particles or the foamed article was prepared and the weight was measured. The pre-expanded particles or the foamed article was put into a messcylinder having a volume of 100 ml in which water was poured to the amount of about half graduation of the messcylinder and then it was immersed under the surface of the water with a tool made of wire net. The volume was calculated from the difference of the graduations on the messcylinder before the pre-expanded particles or the foamed article was immersed into the water and after that. The apparent density is calculated in accordance with the following equation.

$$[\text{Apparent density (g/cm}^3)] = \frac{\text{weight (g)}}{\text{volume (cm}^3)}$$

Expansion ratio

The amount of the inorganic materials based on 100 parts by weight of the CPVC which was shown in Table 2 was measured, and then density of the CPVC contained in the obtained pre-expanded particles or foamed article was calculated in accordance with the following equation.

$$[\text{Density of the } CPVC \text{ (g/cm}^3)] = \frac{\text{Apparent density} \times 100}{[100 + \text{Amount of the inorganic materials}]}$$

Then, the expansion ratio was calculated in the condition that the specific gravity of the CPVC was 1.6 by the following equation.

$$[\text{Expansion ratio (times)}] = \frac{[1.6 \times (100 + \text{Amount of the inorganic materials}]}{[100 \times \text{Apparent density}]}$$

Percentage of melt-adhesion

The foamed article was torn off by bending and its cross section was observed. The number of the broken particles (n) and the whole number of the particles (N) on the cross section were measured. The percentage of melt-adhesion was calculated in accordance with the following equation.

$$[\text{Percentage of melt-adhesion (\%)}] = \frac{n}{N} \times 100$$

TABLE 1

| Material | Trade name | Contents |
|---|---|---|
| CPVC | XH 7225 *1 | Average polymerization degree = 2500 |
| | | Chlorine content = 67% |
| | XH 7211 *1 | Average polymerization degree = 1100 |
| | | Chlorine content = 67% |
| | XH 3112 *1 | Average polymerization degree = 1200 |
| | | Chlorine content = 63% |
| Inorganic materials | Talc | Average particle size = 5.5 μm |
| | Calcium carbonate | Particle size = 70 mesh pass |
| | Asbestos | Yielded from Musori in South Africa 7M by the Quebec Asbester Mining Association Test Procedure |
| Solvent | Toluene | |
| | Benzene | |
| | 1,2,4-Trichlorobenzene | |
| | Butyl cellosolve (BC) | |
| | Diisobutyl ketone (DIBK) | |
| | n-amyl acetate | |
| | CLP *2 | Trischloroethyl phosphate |
| | Cyclohexanone (CNON) | |
| | Diethylbenzene (DEB) | |
| | Isooctyl acetate (IOA) | |
| Pysical blowing agent | R-11 *3 | Trichlorofluoromethane |
| | R-114 *3 | Dichlorotetrafluoroethane |
| | R-12 *3 | Dichlorodifluoromethane |
| Stabilizer | F-22 *4 | Bis(di-n-butyl tin monolaurate maleate) |

(Note)
*1: Available from Kanegafuchi Kagaku Kogyo Kabushiki Kaisha
*2: Available from Daihachi Kagaku Kogyosho Kabushiki Kaisha
*3: Available from Du Pont-Mitsui Polychemicals Company, Ltd.
*4: Available from Akishima Kagaku Kogyo Kabushiki Kaisha
The term "%" means "% by weight".

TABLE 2

| Ex. No. | Foamable composition (parts by weight) | | | | Impregnation of blowing agent | | Pre-expansion Temperature/ Time (°C./sec.) |
|---|---|---|---|---|---|---|---|
| | CPVC | Inorganic material | Solvent | Stabilizer | Physical blowing agent | Impregnating time (hours) | |
| 1 | XH7225 (100) | Talc (100) Asbestos (50) | BC (250) | F-22 (6) | R-114 | 12 | 74/14 |
| 2 | XH7225 (100) | Talc (100) Asbestos (50) | BC (125) CNON (125) | " | " | 5 | 77/15 |
| 3 | XH7225 (100) | Talc (100) Asbestos (50) | BC (125) CNON (125) | " | " | 13 | 75/13 |
| 4 | XH7225 (100) | Talc (50) Asbestos (60) | BC (167) CNON (83) | " | " | 3 | 70/60 |
| 5 | XH7225 (100) | Talc (100) Asbestos (50) | DEB (125) CNON (125) | " | " | 5 | 75/20 |
| 6 | XH7225 (100) | Talc (100) Asbestos (50) | DIBK (125) BC (125) | " | " | 4 | 75/30 |
| 7 | XH7225 (100) | Talc (6) Asbestos (50) | IOA (167) CNON (83) | " | " | 9 | 77/30 |
| 8 | XH7225 (100) | Talc (100) Asbestos (50) | DEB (125) CNON (125) | " | R-11 | 5 | 77/20 |
| 9 | XH7225 (100) | Talc (5) | BC (100) | " | R-114 | 5 | 100/20 |

TABLE 2-continued

| Ex. No. | Foamable composition (parts by weight) | | | | Impregnation of blowing agent | | Pre-expansion Temperature/ Time (°C./sec.) |
|---|---|---|---|---|---|---|---|
| | CPVC | Inorganic material | Solvent | Stabilizer | Physical blowing agent | Impregnating time (hours) | |
| 10 | XH7225 (100) | Talc (250) Asbestos (50) | BC (200) CNON (100) | " | " | 5 | 65/30 |
| 11 | XH7211 (100) | Talc (6) Asbestos (30) | BC (100) CNON (100) | " | " | 5 | 65/15 |

TABLE 3

| Ex. No. | Pre-expanded particles | | Second impregnation of blowing agent | | Foaming temperature (°C.) | Foamed article | | |
|---|---|---|---|---|---|---|---|---|
| | Expansion ratio (times) | Amount of solvent (parts by weight) | Impregnating time (hours) | Physical blowing agent (parts by weight) | | Apparent density (g/cm³) | Expansion ratio (times) | Percentage of melt-adhesion (%) |
| 1 | 30 | BC (25) | 6 | R-114 (36) | 113 | 0.107 | 38 | 73 |
| 2 | 30 | BC (34) CNON (18) | 2 | R-114 (49) | 113 | 0.111 | 37 | 90 |
| 3 | 34 | BC (21) CNON (25) | 1 | R-114 (28) | 100 | 0.108 | 38 | 80 |
| 4 | 24 | BC (12) CNON (5) | 4 | R-114 (21) | 115 | 0.093 | 37 | 82 |
| 5 | 31 | DEB (20) CNON (19) | 2 | R-114 (30) | 110 | 0.105 | 39 | 75 |
| 6 | 39 | DIBK (25) BC (28) | 3 | R-114 (37) | 110 | 0.095 | 43 | 79 |
| 7 | 21 | IOA (21) CNON (11) | 2 | R-114 (31) | 113 | 0.100 | 26 | 90 |
| 8 | 31 | DEB (21) CNON (17) | 2 | R-11 (28) | 110 | 0.113 | 36 | 78 |
| 9 | 26 | BC (15) | 2 | R-114 (30) | 115 | 0.047 | 36 | 90 |
| 10 | 30 | BC (21) CNON (9) | 2 | R-114 (29) | 115 | 0.168 | 38 | 71 |
| 11 | 22 | BC (25) CNON (13) | 3 | R-114 (33) | 110 | 0.081 | 27 | 77 |

COMPARATIVE EXAMPLE 1

The pre-expanded particles obtained in Example 2 were allowed to stand in a hot air circulating type oven at 60° C. for 14 days to remove the solvent contained in the pre-expanded particles by volatilization.

As the result that the amount of the solvent remained in the pre-exapnded particles was measured by gas chromatography analysis in the same manner as in Examples 1 to 11, 0.5 parts by weight of BC and 0.4 parts by weight of CNON based on 100 parts by weight of the CPVC were impregnated. Then R-114 was impregated into the particles again and the particles were subjected to foaming in a mold at 140° C. The percentage of melt-adhesion of the obtained foamed article was 20%.

EXAMPLES 12 TO 17

The procedure of Examples 1 to 11 was repeated except that the amount of the residual solvent in the pellets which were not pre-expanded was changed as shown in Table 4 to give pre-expanded particles and a foamed article.

In addition to the processes in Examples 1 to 11, before a blowing agent was impregnated into the pellets in an autoclave having a content value of 8 l, the space in the autoclave was partitioned into the upper part and the lower part with a wire net made of stainless steel, the physical blowing agent was poured into the lower part and the pellets were put on the wire net to contact with a gaseous blowing agent not contacting with a liquid blowing agent directly (hereinafter referred to as "gaseous phase impregnation"). Then the pellets were expanded in the same manner as in Examples 1 to 11 to give a pre-expansion particles (Examples 15 to 17).

The amount of the solvent, expansion ratio and volume retention of the obtained pre-expanded paticles and the foamed article were measured. The volume retention was measured in accordance with the following method. The results are shown in Table 4.

Volume retention

A proper quantity of the pre-expanded particle or the foamed article was prepared and was put into a messcylinder having a content volume of 100 ml in which water was poured about half of the maximum graduation. The pre-expanded particles or the foamed article were immersed under the surface of the water with a tool made of wire net. The volume of the pre-expanded particles or the foamed article before heating was calculated from the difference of the graduations on the cylinder before the pre-expanded particles or the foamed article were dipped into water.

After the pre-expanded particles or the foamed article were air-dried, they were allowed to stand in a hot-air circulation type oven at 200° C. for 1 hour.

The volume of the pre-expanded particles or the foamed article after heating were calculated in the same manner as in the above.

The volume retension was calculated in accordance with the following equation.

[Volume retention (%)] =

$$\frac{\text{[Volume of the pre-expanded particles or the foamed article after heating]}}{\text{[Volume of the pre-expanded particles or the foamed article before heating]}} \times 100$$

An ampule made of stainless steel having a content volume of 320 ml was charged with a physical blowing agent shown in Table 1 with about 100 g of the pellets from which the solvent was volatilized by means of the above-mentioned method and the ampule was sealed and was maintained at the temperature and for the period of time shown in Table 5. The vapour pressure of the physical blowing agent was confirmed by a manometer equipped to the ampule.

After the ampule was allowed to stand for 15 to 16 hours at the temperature, it was cooled to room temperaure. Then, the pellets were taken out from the ampule and the amount of the blowing agent impregnated in the pellets was measured.

The pellets containing the blowing agent were put into a basket made of stainless steel net and were pre-expanded in an autoclave by heating with steam at the temperature and for the period of time shown in Table 5.

As to the obtained pre-expanded particles, apparent density, expansion ratio and the percentage of closed cell were measured. The percentage of closed cell was calculated by the following method. The results are shown in Table 5.

Percentage of closed cell

The percentage of closed cell was measured in accordance with ASTM D 2856 with an air comparison type aerometer manufactured by Beckman Toshiba Kabushiki Kaisha.

TABLE 4

| Ex. No. | Foamable composition (parts by weight) | | | | Impregnation of blowing agent | | |
|---|---|---|---|---|---|---|---|
| | CPVC | Inorganic materials | Solvent | Stabilizer | Physical blowing agent | Impregnating time (hours) | Impregnated Phase |
| 12 | XH7225 (100) | Talc (100) Asbestos (50) | BC (83) CNON (167) | F-22 (6) | R-114 | 32 | Liquid phase |
| 13 | XH7225 (100) | Talc (100) Asbestos (50) | BC (125) CNON (125) | " | " | 4 | Liquid phase |
| 14 | XH7225 (100) | Talc (100) Asbestos (50) | BC (125) CNON (125) | " | " | 3 | Liquid phase |
| 15 | XH7225 (100) | Talc (100) Asbestos (50) | BC (167) CNON (83) | " | " | 10 | Gaseous phase |
| 16 | XH7225 (100) | Talc (100) Asbestos (50) | BC (167) CNON (83) | " | " | 6 | Gaseous phase |
| 17 | XH7225 (100) | Talc (100) Asbestos (50) | BC (167) CNON (83) | " | " | 3 | Gaseous phase |

| Ex. No. | Amount of residual solvent in pellets (parts by weight) | | | Pre-expanded particles | | Foamed article | |
|---|---|---|---|---|---|---|---|
| | BC | CNON | Total amount | Expansion ratio (times) | Volume retention (%) | Expansion ratio (times) | Volume retention (%) |
| 12 | 9 | 31 | 40 | 43 | 28 | 56 | 19 |
| 13 | 46 | 27 | 73 | 39 | 60 | 54 | 35 |
| 14 | 57 | 31 | 88 | 39 | 70 | 55 | 45 |
| 15 | 71 | 36 | 107 | 30 | 79 | 43 | 57 |
| 16 | 95 | 40 | 135 | 22 | 97 | 39 | 61 |
| 17 | 104 | 44 | 148 | 19 | 123 | 31 | 72 |

EXAMPLES 18 TO 29

There was prepared 2,500 g of a foamable composition by using the materials shown in Table 1 in the mixing ratio shown in Table 5. A CPVC and inorganic materials were mixed for 30 minutes in a Henschel mixer having a content volume of 10 l.

The mixed powder of the materials was put into an intensive kneader having a content volume of 3 l with a solvent and a stabilizer, and the kneading was carried out at 100° C. for 30 minutes. After the mixture was supplied to a plunger extruder and was maintained at 185° C. for 35 minutes, the mixture was cooled to at the temperature of 80° to 90° C. Then the mixture was extruded through dies having an bore diameter of 3 mm to give a strand. The obtained strand was cut with a cutter (a pelletizer) in a length of 2 to 4 mm to produce pellets.

The solvent contained in the pellets was volatilized by heating the pellets in a hot-air circulation type oven at 80° C. for about twenty-four hours.

TABLE 5

| Ex. No. | Foamable composition (parts by weight) | | | |
|---|---|---|---|---|
| | CPVC | Inorganic material | Solvent | Stabilizer |
| 18 | XH 7225 (100) | Talc (50), Calcium carbonate (50), Asbestos (30) | Toluene (330) | F-22 (6) |
| 19 | XH 7225 (100) | Talc (50), Asbestos (40) | Toluene (300) | F-22 (6) |
| 20 | XH 7225 (100) | Talc (6), Asbestos (30) | Benzene (260) | F-22 (6) |
| 21 | XH 7211 (100) | Talc (6), Asbestos (30) | Toluene (280) | F-22 (6) |
| 22 | XH 3112 (100) | Talc (50) | Toluene (200) | F-22 (6) |
| 23 | XH 7225 (100) | Talc (100), Asbestos (50) | Toluene (250), CLP (50) | F-22 (6) |
| 24 | XH 7225 (100) | Talc (100), Asbestos (50) | Toluene (250), CLP (50) | F-22 (6) |
| 25 | XH 7225 (100) | Talc (100), Asbestos (50) | Toluene (250), CLP (50) | F-22 (6) |

TABLE 5-continued

| Ex. No. | | | | | | |
|---|---|---|---|---|---|---|
| 26 | XH 7225 (100) | Talc (6) | | 1,2,4-trichlorobenzene (100) | | F-22 (6) |
| 27 | XH 7225 (100) | Talc (6) | | BC (100) | | F-22 (6) |
| 28 | XH 7225 (100) | Talc (6) | | DIBK (100) | | F-22 (6) |
| 29 | XH 7225 (100) | Talc (6) | | n-Amyl acetate (100) | | F-22 (6) |

| | Impregnation of the blowing agent | | | Temperature | Pre-expanded particles | | |
|---|---|---|---|---|---|---|---|
| Ex. No. | Physical blowing agent | Temperature Time (°C./hours) | Amount (parts by weight) | and time of pre-expansion (°C./min.) | Apparent density (g/cm³) | Expansion ratio (times) | Percentage of closed cell (%) |
| 18 | R-11 | 80/16 | 22 | 113/2 | 0.161 | 23 | 99 |
| 19 | R-11 | 85/15 | 20 | 115/2 | 0.164 | 19 | 74 |
| 20 | R-11 | 80/16 | 22 | 120/1.5 | 0.091 | 24 | 99 |
| 21 | R-11 | 80/16 | 21 | 110/2 | 0.116 | 19 | 100 |
| 22 | R-11 | 80/16 | 25 | 120/2 | 0.098 | 24 | 98 |
| 23 | R-11 | 80/15 | 14 | 115/2 | 0.205 | 20 | 97 |
| 24 | R-114 | 80/15 | 20 | 106/1 | 0.379 | 11 | 95 |
| 25 | R-12 | 80/15 | 8 | 110/2 | 0.329 | 12 | 77 |
| 26 | R-114 | 30/15 | 7 | 100/2 | 0.222 | 8 | 80 |
| 27 | R-114 | 30/15 | 22 | 100/2 | 0.061 | 28 | 98 |
| 28 | R-114 | 30/15 | 18 | 100/0.5 | 0.108 | 15 | 86 |
| 29 | R-114 | 30/15 | 19 | 100/2 | 0.104 | 16 | 97 |

COMPARATIVE EXAMPLE 2

There were kneaded 100 parts by weight of XH 7211, 6 parts by weight of talc, 30 parts by weight of asbestos and 6 parts by weight of F-22 without mixing with a solvent by using a 6 inch biaxial roll at 210° C. to give a sheet having a thickness of about 2 mm.

The sheet was cut into small pieces having a side length of 3 to 4 mm. The pieces and R-11 were put into an ampule made of stainless steel having a content volume of 320 ml and the ampule was sealed. The ampule was maintained at the temeprature of 80° C. for 16 hours. The amount of the R-11 impregnated into the pieces just after the pieces were taken out from the ampule was 20 parts by weight. However, in comparison with the case in Example 21, R-11 was drained out from the pieces very rapidly, and further, the pieces were hardly expanded although they were subjected to the pre-expansion by heating with steam at 110° C. for 2 minutes.

In addition to the ingredients used in the Examples, other ingredients can be used in the Examples as set forth in the specification to obtain substantially the same results.

What is claimed is:

1. A process for preparing pre-expanded pellets of chlorinated vinyl chloride resin having an average degree of polymerization of 300 to 5000 and a chlorine content of 60 to 75% by weight containing inorganic material selected from the group consisting of particles and fibers which comprises kneading a chlorinated vinyl chloride resin, inorganic material and a solvent, pelletizing the kneaded mixture, impregnating a physical blowing agent into the resulting pellets and pre-expanding the pellets.

2. The process for preparing of claim 1, wherein the used amount of inorganic material is 5 to 1000 parts by weight based on 100 parts by weight of the chlorinated vinyl chloride resin.

3. The process of claim 1, wherein the solvent shows a compatibility with a chlorinated vinyl chloride resin.

4. The process of claim 1, wherein the used amount of the solvent is 10 to 2000 parts by weight based on 100 parts by weight of the chlorinated vinyl chloride resin.

5. The process of claim 1, wherein a stabilizer is contained.

* * * * *